Patented Sept. 6, 1938

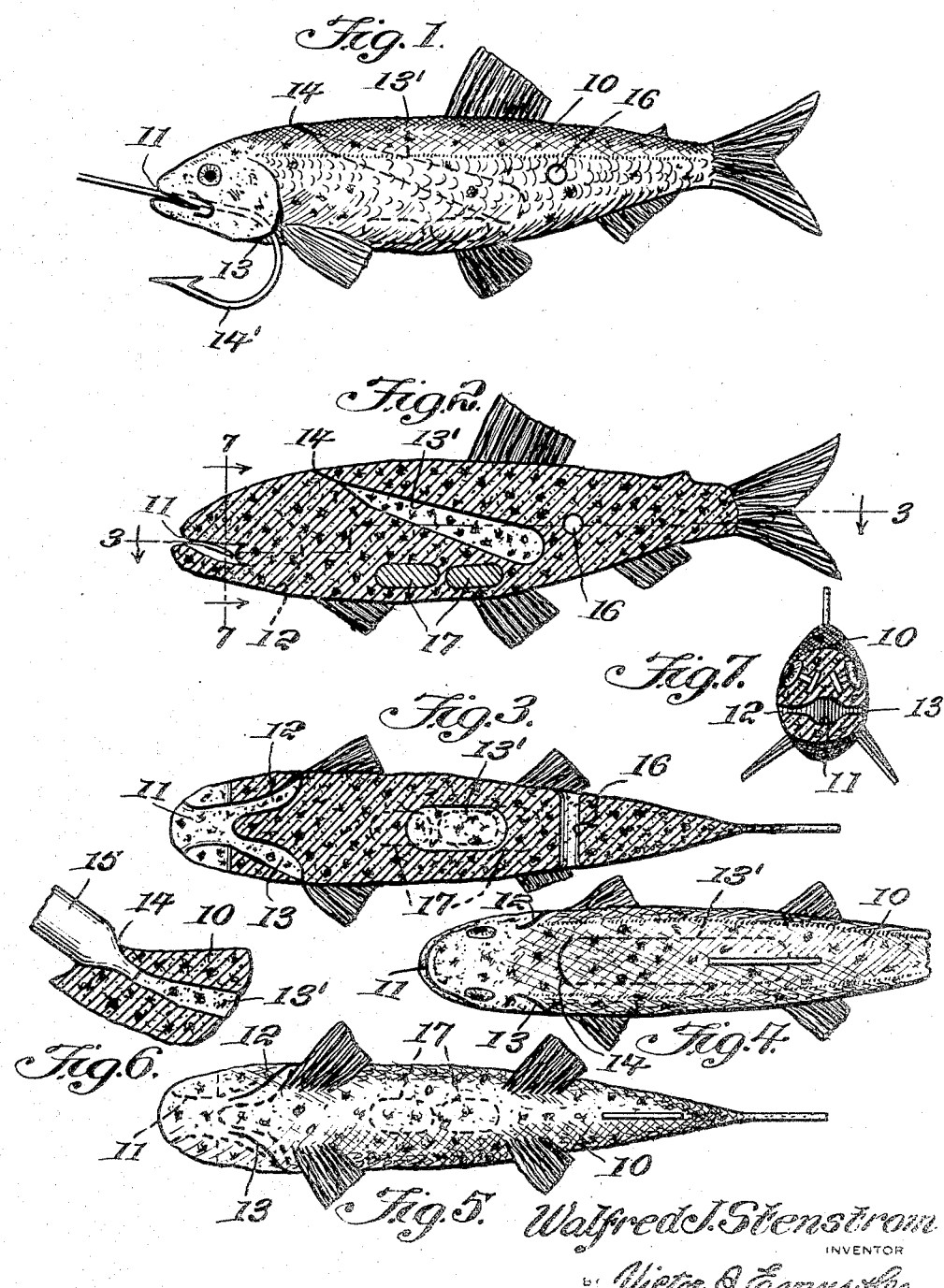

2,129,245

UNITED STATES PATENT OFFICE 2,129,245

FISH LURE

Walfred J. Stenstrom, Federal Dam, Minn.

Application August 27, 1937, Serial No. 161,321

1 Claim. (Cl. 43—46)

This invention relates to fish lures and has for an object to provide a sponge rubber minnow adapted to permit of a hook being thrust into the mouth and through the gills.

A further object is to provide an artificial bait of this character which will be provided with weights to promote proper action of the minnow in the water.

A further object is to provide a sponge rubber minnow having an internal cavity into which may be injected a scenting fluid that eventually will permeate the rubber.

A further object is to provide an artificial bait of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of a sponge rubber minnow having novel passages in the head for interchangeably receiving a fish hook.

Figure 2 is a longitudinal sectional view of the minnow shown in Figure 1 and showing the weights and the scent medium cavity.

Figure 3 is a longitudinal sectional view taken on the line 3—3 of Figure 1 showing the shape of the hook receiving head cavity.

Figure 4 is a top plan view of the bait.

Figure 5 is a bottom plan view of the bait.

Figure 6 is a fragmentary detail sectional view showing the manner of injecting the scenting medium.

Figure 7 is a detail cross sectional view taken on the line 7—7 of Figure 2 and showing the shape of the hook receiving passages.

Frequently it is desired to attach an artificial bait to the hook one is using but hitherto there has been no artificial bait provided in the head with interchangeable hook receiving passages to permit the fisherman to attach and remove artificial bait from a favorite hook which he is using.

Referring now to the drawing in which like characters of reference designate similar parts in the various views, the present invention provides a sponge rubber minnow 10 having a longitudinal passage or duct 11 in the head extending rearwardly and being branched at the rear end to open through the gills in ducts 12 and 13. A fish hook 14' may be passed selectively through the duct 11 and either of the ducts 12 or 13 to attach the minnow to the hook securely and yet permit of detaching the minnow for replacement of a different colored bait as often as desired.

Formed obliquely in the body of the minnow from a point near the head to a point near the rear end is a chamber 13' adapted to receive a scent medium of any preferred type, there being an entrance slit 14 at the upper forward end of the chamber to permit insertion of the spout of a container 15, as shown in Figure 6, for filling the cavity. When the container is withdrawn the elasticity of the rubber immediately seals the slit so that the scent medium is retained in the cavity and eventually will permeate the rubber structure of the minnow and add to the attractiveness of the lure.

An opening 16 is formed transversely through the body of the minnow near the tail thereof for interchangeably receiving the hook 14'.

Lead weights 17 are disposed in the body of the minnow below the scent medium cavity 13 and these weights assist in maintaining the minnow in natural position in the water.

From the above description it is thought that the construction and operation of the invention will be fully understood without further explanation.

What is claimed is:

A sponge rubber minnow having a head and gills, and a channel in the head having diverging branches opening through the gills to receive a fish hook.

WALFRED J. STENSTROM.